UNITED STATES PATENT OFFICE 2,484,834

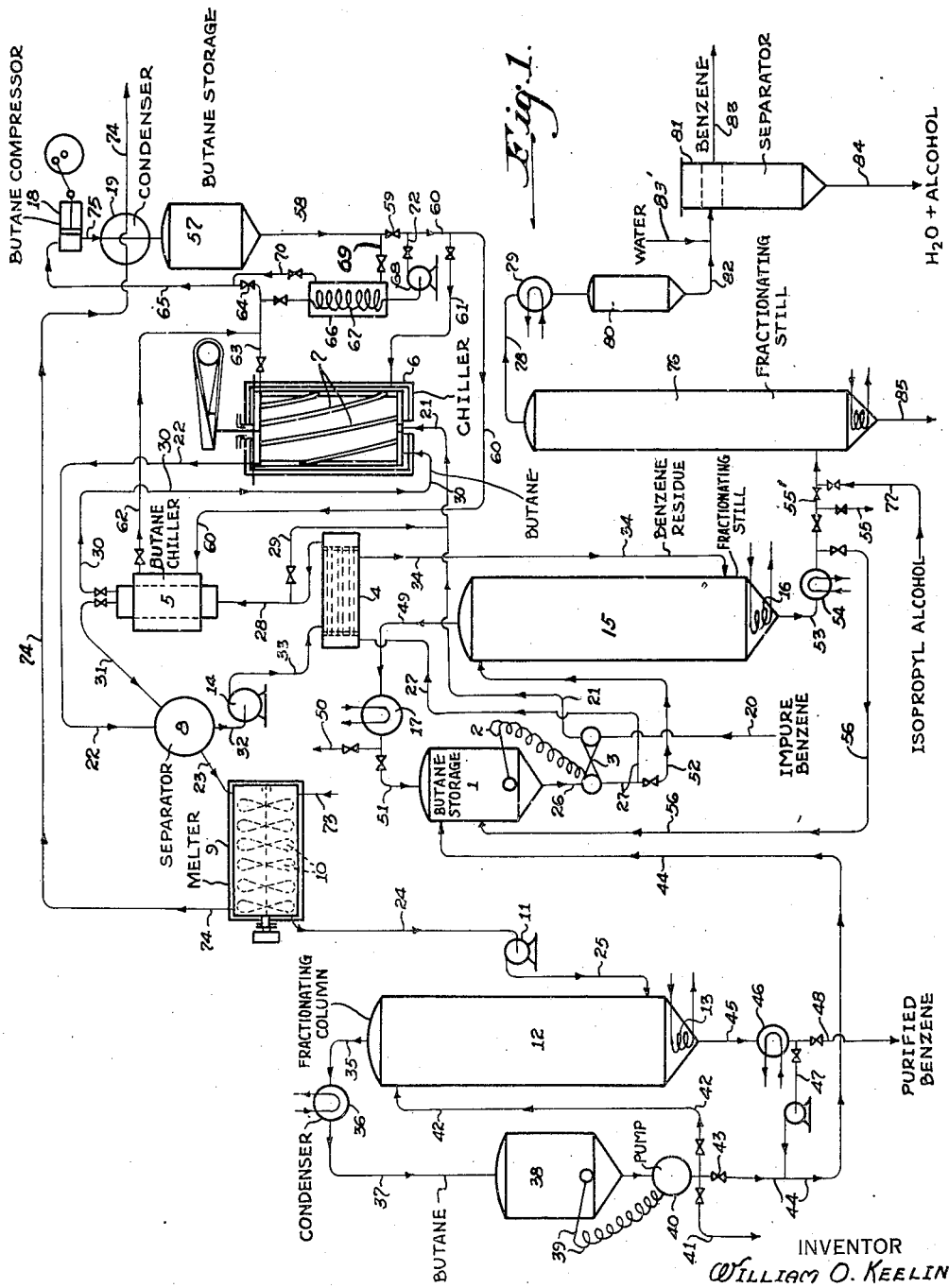

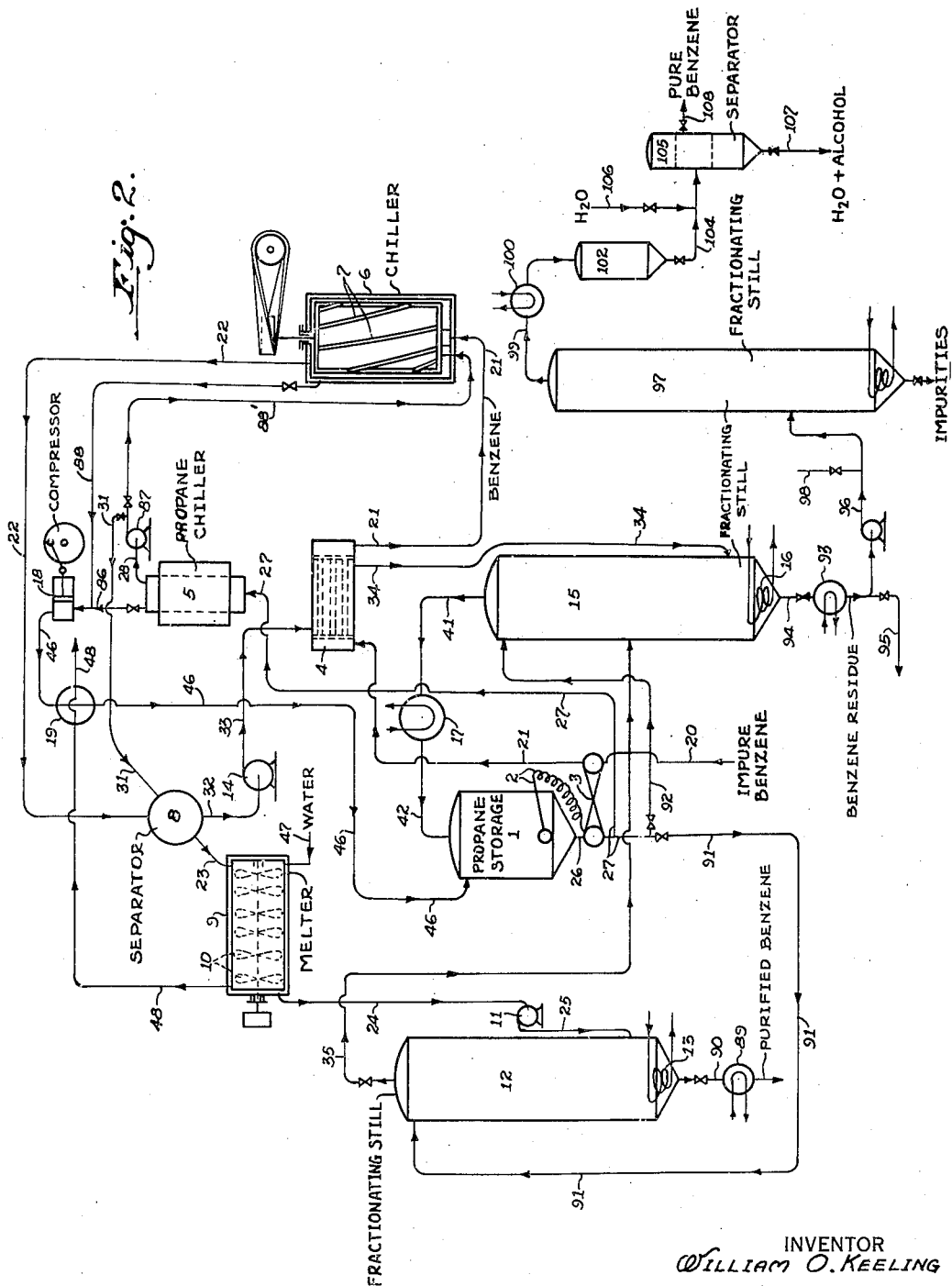

METHOD OF REFINING LIGHT OIL PRODUCTS

William O. Keeling, Pittsburgh, Pa., assignor to Koppers Company, Inc., Pittsburgh, Pa., a corporation of Delaware Application April 9, 1945, Serial No. 587,255

8 Claims. (Cl. 260—674)

The present invention relates to a process for recovering benzene of a high degree of purity from admixtures with other miscible hydrocarbons, and especially pertains to an improved method for separating benzene from therewith miscible hydrocarbons having boiling temperatures close to that of pure benzene.

The bulk of the benzene now produced in this country has its source in coke-oven light oil. Benzene so produced may be associated with other compounds, such, for example, as those familiarly known as the aromatics, unsaturated, paraffins, naphthenes, and sulphur compounds. The separation of benzene from these compounds is normally carried out by chemical treatment and distillation. Often such methods fail to yield a benzene sufficiently free of these associated compounds to make it desirable for certain uses, such, for example as nitration or chlorination. The present invention is particularly applicable for the separation of benzene of a high degree of purity from mixtures containing varying proportions of the above-mentioned materials and especially from such paraffinic and cyclic hydrocarbons as n-pentane, cyclopentane and the corresponding hexanes, heptanes, and the like, having physical characteristics which make them difficult of separation with the equipment generally used in the art. These compounds may be present to the extent of about two to three per cent, their concentration depending on various factors, some of which are the type of coal carbonized, coking time and absorbent oil employed. Not only is the present improvement of great utility in the refinement of benzene obtained from coke-oven light oil, but it is also of advantage in the refinement of benzene derived from petroleum, water gas tar, drip oils or from special synthesis.

A primary object of the present invention is to provide a simple and effective method whereby benzene of a high degree of purity can be continuously separated from other hydrocarbons with which it is admixed in consequence of its method of formation or of its recovery.

Another object of the invention is to provide a method by which benzene of high degree of purity may be separated from impurities by a combination of different solvents to obtain a high recovery at a comparatively low cost.

A further object of the invention is to provide a method by which benzene of a high degree of purity may be separated from impurities by a combination of crystallization and azeotropic distillation.

A further object of the present invention is to provide a simple and effective method whereby benzene of a high degree of purity can be continuously separated from admixture thereof with associated hydrocarbons or other compounds having boiling points that are either higher or lower than that of pure benzene and particularly from paraffinic or other compounds having boiling temperatures close to that of pure benzene or which may form azeotropic mixtures therewith.

A further object of the present invention is to provide a simple and effective method whereby benzene of a high degree of purity can be continuously separated from admixtures with associated hydrocarbons by crystallization.

A further object of the present invention is to provide a simple and effective method whereby liquids miscible with benzene are usable as diluents and as carrying agents for the benzene crystals formed when impure benzene is chilled and also as direct or indirect chilling agents in a purification process employing a crystallization step.

The invention has for further objects such other improvements and such other operative advantages or results as may be found to obtain in the method hereinafter described or claimed.

According to the present invention an impure benzene product is subjected to a crystallization step after there has been admixed therewith a preferred quantity of an extraneously derived and therewith miscible liquid which will not crystallize from the admixture within the temperature range employed in the step for crystallizing the benzene. The admixture is introduced into a chilling zone through which it is passed at a velocity adequate to crystallize benzene therefrom and to produce a flowable slurry, which comprises preferably a dispersion of relatively small, individual benzene crystals uniformly distributed throughout the carrier liquid, and which continuously passes therethrough, said velocity always being sufficient to retain the crystallized benzene in suspension in a mother liquor, thus keeping the walls of the chilling apparatus substantially free of benzene incrustations. Upon leaving the chilling zone the slurry is continuously passed through any preferred apparatus for separating the benzene crystals from residual mother liquor, such as a continuous filter or centrifuge. After the separation, the former are washed with either a fresh portion of the miscible liquid or, if preferred, by a small amount of pure benzene previously produced by the process, to remove therefrom residual mother liquor. This washing step is carried out without substantial melting of the crystalline benzene and thereafter the purified crystals are continuously transferred to a melting chamber and liquefied by any preferred means, such as, indirect heat exchange with, for example, water.

On account of the high cost of refrigerating the mixture of benzene and solvent, it has been found that it is more economical to recover not more than 75 percent of the benzene, and preferably 50 percent of the benzene, by freezing and crystallization, and then make the further recovery of the benzene by azeotropic distillation. Butane or propane or a combination of these hydrocarbon solvents may be used to recover the major portion of the benzene by chilling and crystallization, and a minor portion of the benzene may thereafter be recovered with an aliphatic alcohol solvent, such as isopropyl alcohol, that forms an azeotrope with the benzene and permits pure benzene to be recovered by azeotropic distillation. Such a combination of solvents permits the benzene to crystallize at a moderate freezing temperature and the use of a comparatively small amount of paraffin hydrocarbon as a solvent, and thereafter the remaining benzene may be recovered with a comparatively small amount of alcohol solvent to form a small amount of azeotropic distillation liquids.

The invention further provides for the treatment of the separated mother liquor for the recovery of miscible liquid therefrom and also for its optional recovery from wash liquor residual in the melted benzene, the both of which can be returned thereafter to the method.

Liquid butane, liquid propane, the petroleum derivative commercially known as Stoddard solvent, and certain of the alcohols can be used as the extraneously derived, miscible liquid for diluting the to-be-purified benzene product before it is passed to the chilling zone. These materials all have solidification points below that of benzene so that they do not crystallize therewith, and such of these materials as are entrained in the crystalline benzene can be easily removed in a washing step or by fractional distillation, the low boiling materials appearing in the first fraction whereas the Stoddard solvent is recovered as a distillation residue. The alcohols which form azeotropes with benzene can be recovered by simple water extraction of the melted benzene. The low boiling paraffin hydrocarbons are particularly good solvents for the benzene as well as for the impurities such as aromatics, unsaturated hydrocarbons, paraffins, naphthenes, cyclopentane, normal pentane and hexane which are often present as impurities in the benzene.

In the accompanying drawings forming a part of this specification and showing for purposes of exemplification a preferred apparatus and method in which the invention may be embodied and practised but without limiting the claimed invention specifically to such illustrative instance or instances:

Figure 1 shows in diagrammatic manner apparatus wherein are practised principles of the present invention more specifically when they are practised in combination with benzene diluents having boiling points substantially different from that of the to-be-purified benzene; and Figure 2 shows in diagrammatic manner apparatus wherein are practised principles of the present improvement more especially when they are practised in combination with benzene diluents having boiling points lower than that of the to-be-purified benzene and further employing said diluents as freezing agents in the process by the controlled evaporation of a portion of said diluent from the admixture.

The same characters of reference designate the same parts in each of the views of the drawings.

Referring now to the drawings: Figure 1 particularly illustrates in diagrammatic manner apparatus suitable for carrying out the present process in those of its applications wherein there are employed miscible liquids, such as butane or the like, Stoddard solvent, or isopropyl alcohol or the like, of which the boiling points and crystallization temperatures are substantially different from those of benzene. The apparatus is adapted to operate at pressures above or below atmospheric, where the physical properties of the preferred diluent so require.

The benzene mixture to be purified enters one section of the proportioning pump 3 through line 20, from a suitable storage tank (not shown), and is pumped through line 21 to chiller 6. The liquefied butane employed for dilution of the benzene mixture is stored in tank 1, equipped with level control 2 that governs proportioning pump 3 as a safety device in those cases where the level in storage tank 1 may become too low. The liquefied butane is withdrawn from storage tank 1 through line 26 by proportioning pump 3 which sends it through line 27 to heat exchanger 4 wherein it is given a preliminary chilling by colder liquids from a further step in the process; the cooled butane leaves heat exchanger 4 through line 28 and thereafter enters chiller 5 wherein said butane is chilled to the preferred temperature by indirect contact with further quantities of butane expanded in the refrigerating jacket of chiller 5. The expanded butane vapors leave the refrigerating jacket of chiller 5 through valved line 62, and are returned to compressor 18 through line 63, valve 64 and line 65. The compressed butane returns to storage tank 57 through line 75 as a liquid after passage through condenser 19. Further quantities of butane for use in the refrigerating jacket of chiller 5 are obtained from storage tank 57 through line 58, valve 59 and line 60.

The now chilled and liquefied butane to be used for dilution and crystallization of the benzene-containing liquid leaves chiller 5 through valved line 30 and enters chiller 6 at a point adjacent to the point where the to-be-purified benzene enters the same through line 21. A sufficient quantity of the chilled and liquefied butane is intimately and rapidly mixed with said benzene-containing mixture to convert the admixture from a liquid to a slurry wherein the benzene is in the form of very fine crystals which are suspended in a mother liquor comprising the benzene impurities and the liquefied butane. Scraper conveyor 7 may be employed to free the walls of chiller 6, whenever necessary, of benzene incrustations.

The amount of butane introduced into the chiller 30 or into the benzene line 21 will depend upon the method used in purifying the benzene. If the benzene is to be recovered solely by crystallization, then the butane may be equal up to 50 percent by volume of the benzene because a comparatively low temperature minus 20 degrees Fahrenheit may be required (depending on the purity of the benzene) to recover 75 percent of pure benzene in one treatment. If a combination of crystallization and azeotropic distillation is to be used, then the amount of butane should not be more than 20 percent by volume of the benzene and preferably should only be sufficient to provide a free flowing slurry of the benzene in the mother liquor crystals. About 15 percent by volume of butane in the benzene will provide a good slurry of benzene crystals when the temperature of the mixture is about zero degrees Fahrenheit and will permit a recovery of pure benzene of about 50 to 60 percent in one treatment. Since the butane has to be chilled and thereafter has to be separated from the benzene by fractional distillation, it is desirable to use the minimum amount of butane for economy.

The slurry-like mixture is discharged as a flowable mass from chiller 6 through line 22 to the continuous separator 8 wherein the crystallized benzene is continuously separated from the liquid fraction, of which the residues that may adhere to the benzene crystals after said separation are preferably washed out by means of additional quantities of chilled fresh butane, without substantial melting of the benzene crystals. This chilled butane wash liquid is obtained from chiller 5 through valved line 31. The benzene crystals of high degree of purity obtained after the continuous separation of the original mother liquor and the further washing with additional quantities of chilled butane are discharged from separator 8 through line 23 to melter 9, equipped with stirrers 10. In said melter crystallized benzene is moved by stirrers 10 to bring it quickly to the adjacent surface of a water jacket to be converted to a liquid by indirect heat exchange with water. The water used to melt the benzene crystals enters the jacket of melter 9 through line 73 and is discharged through line 74 to condenser 19 where advantage is taken of its low temperature to again liquefy the butane vapors after they leave compressor 18. The jacket of the melter can be augmented with coils arranged within the melting chamber itself, if preferred.

The now melted benzene in melter 9 flows through line 24 to pump 11, said pump sending the benzene through line 25 to fractionating column 12. By means of indirect heat supplied by steam coil 13 the residual quantity of butane is separated from the highly purified benzene. The butane leaves as a vapor at the top of fractionating column 12 through line 35, is again liquefied in condenser 36 and leaves through line 37 to butane receiver 38. Receiver 38 is equipped with level control 39 that governs pump 40 as a safety device in those cases where the level in receiver 38 may become too low. Pump 40 draws the liquid butane from receiver 38, discharging a regulated quantity for reflux through valves line 42 to fractionating column 12. The amount in excess of the reflux is returned to storage tank 1 valve 43 and line 44 where it again becomes available for the further separation of benzene from benzene-containing mixtures in accordance with the present process. The benzene, after separation of the residual butane, leaves at the bottom of fractionating column 12 through line 45, cooler 46 and is thereafter sent to a suitable storage tank (not shown) through valved line 48. Valved line 41 and also valved pump line 47 are closed off during this method of operating the apparatus.

The mother liquor separated originally from the benzene crystals in continuous separator 8 plus the additional quantities of liquefied butane used for washing the benzene crystals free of residual traces of impurities are admixed and withdrawn from said separator 8 through line 32 by pump 14 which sends said admixture through line 33 to heat exchanger 4 where advantage is taken of the low temperature of said admixture to cool further quantities of the liquefied butane flowing to chiller 5. From heat exchanger 4 said admixture is discharged through line 34 to fractionating column 15 wherein, by means of indirect heat supplied by steam coil 16, a separation is effected whereby the butane, in a highly purified state, is recovered from the benzene impurities. The butane leaves as a vapor at the top of column 15 through line 49 and is again liquefied in condenser 17 and thereafter returned to storage tank 1 through valved line 51. The necessary reflux to column 15 is supplied by proportioning pump 3 through valved line 52. From the bottom of column 15 are withdrawn the impurities, which may contain some benzene, through line 53 and after passage through cooler 54 are discharged to a suitable storage tank (not shown) through valved line 55. Valved lines 55' and 56 are closed off during this method of operating the apparatus.

When about 50 percent of the benzene is to be recovered by crystallization as explained above, another 35 to 45 percent of the benzene may be recovered by azeotropic distillation. To accomplish this the benzene in the residue or mother liquor from which the butane has been separated will flow through the line 55' to a fractionating still 76. To the impure benzene passing through the line 55' is added isopropyl alcohol through a valved line 77. The isopropyl alcohol forms an azeotropic mixture with the benzene composed of approximately two-thirds benzene and one-third alcohol. Therefore in accordance with the amount of benzene in the residue about one-third of the amount of benzene and by volume of alcohol will be added to the impure product. The benzene-alcohol azeotrope will be distilled overhead through a line 78, condensed in condenser 79 and collected in receiver 80. As the azeotropic mixture passes from the receiver 80 to a separator 81 through a line 82 a sufficient amount of water is added from line 83' to the azeotropic mixture to dilute the alcohol and separate the diluted alcohol from the benzene. The benzene may be removed from the separator through a line 83 and the dilute alcohol solution will leave the bottom of the separator through a line 84. The mother liquor containing some benzene will move from the bottom of the still 76 through a line 85. By azeotropic distillation it is possible to recover a nitration grade benzene to the extent of 80 to 90 percent of the benzene in the impure mother liquor. Accordingly the amount of alcohol that is added should not be much more than is required to form an azeotrope with 90 percent of the benzene in the mother liquor coming from the bottom of the still 15.

The combination of crystallization and azeotropic distillation permits a high recovery of nitration grade benzene with the minimum amount of solvent and the minimum amount of distillation to separate the solvent from the benzene. Furthermore, the amount of refrigeration which is required for crystallizing the benzene and the amount of power required for recovering the paraffin hydrocarbons is greatly reduced. The combined solvent process may be carried on continuously and the cooling and fractional distillation operations are comparatively simple so that the apparatus will have a large capacity.

The benzene impurities, which are readily soluble in the butane, after separation from the butane as indicated above may be sent directly to motor fuel storage in those instances where the original benzene product being processed is relatively pure.

In a modification of the above-described method for employing butane, or the like, as a chilling agent, the same is chilled in heat exchanger 4 wherein it is cooled an amount insufficient to produce substantial crystallization of the benzene when the two are admixed before entering chiller 6, the actual crystallization being effected by indirect contact with further quantities of butane expanded within the jacket of said chiller. The to-be-treated benzene flowing through line 21 is admixed, previous to its admission to chiller 6, with liquefied butane partially chilled in heat exchanger 4 and flowed through valved line 29 appropriately adjusted to permit the preferred quantity to flow to and admix with the benzene of line 21. In this modification valved line 30 leading directly to chiller 6 from chiller 5 is closed. The benzene-butane admixture is converted from a liquid to a slurry of benzene crystals suspended in mother liquor by indirect contact with expanding butane in the jacket of chiller 6 while flowing through said chiller. Thereafter, the subsequent operations for the production of a highly purified benzene are the same as previously described.

In this latter modification of the improvement certain additional lines are required to supply butane to the jacket of chiller 6. The necessary butane is drawn from storage tank 57 through line 58, valve 59, line 60 and enters said jacket of the chiller through valved line 61. The butane vapors from said jacket are returned to compressor 18 through valved line 63, valve 64, and line 65. The circuit is completed through line 75 and condenser 19 to storage tank 57.

Ammonia, or other refrigerants, can be employed for indirect chilling in the jackets of chillers 5 and 6. If preferred, an aqueous saline solution can be chilled and circulated through the jackets of chillers 5 and 6. In this modification of the refrigeration system the expansion of butane, ammonia or other preferred refrigerant takes place in a separate chamber 66, equipped with coils 67 for said saline solution. The preferred refrigerant is supplied from tank 57 through line 58 and valved line 69 and returned for compression through valved line 70 and line 65. In this case valves 59 and 64 are closed and the saline solution, chilled in coils 67 of chamber 66, is circulated by pump 68 through valved line 72 and as required to chillers 5 and 6 through line 60 and valved line 61 respectively. The saline solution is returned to coils 67 for further chilling through valved lines 62, 63 and 71.

The illustrated apparatus of Figure 1 has been above-described as it is employed for the production of highly purified benzene from benzene-containing mixtures after admixing therewith as a diluent liquefied butane, or the like, whose boiling point is substantially lower than that of the benzene in said admixture. The apparatus, with some modifications, lends itself to the use of diluents boiling at temperatures substantially higher than does benzene. An example of such diluent is Stoddard solvent, a petroleum derivative well known to the cleaning and dyeing industry, having a boiling range higher and a freezing temperature lower than that of benzene. Stoddard solvent has a boiling range substantially between 140° C. and 210° C. and is produced to meet definite standards as set forth in Commercial Standard CS3–40 of the Bureau of Standards, United States Department of Commerce. Stoddard solvent, in like manner to that previously described, may be admixed with a benzene-containing mixture, the admixture chilled to a flowable slurry by any preferred method and the slurry flowed through the apparatus continuously to produce highly purified benzene, excepting only that in the final separations, in the fractionating columns, the Stoddard solvent which in this case is the higher boiling constituent is drawn off at the bottom.

The benzene-containing mixture and the Stoddard solvent are flowed from their respective storage tanks through the chillers, separator, melter and to the fractionating columns as shown by the arrows and as previously described. In fractionating column 12 the highly purified benzene leaves as a vapor through line 35, is liquefied in condenser 36 and flows through line 37 to receiver 38. Pump 40 sends the benzene to a storage tank (not shown) through valved line 41 while the necessary reflux is taken off through valved line 42. With this method of operation valve 43 is closed. The Stoddard solvent is withdrawn from the bottom of column 12 through line 45, cooler 46 and through valved pump line 47 to line 44 whence it is returned to Stoddard solvent storage tank 1 for further use in the process. In fractionating column 15 the benzene impurities, containing some benzene, are removed as vapors through line 49, and are again liquefied in condenser 17 and flowed to a suitable storage tank (not shown) through valved line 50, valved line 51 being closed. The Stoddard solvent is withdrawn from column 15 and returned to storage tank 1 through line 53, cooler 54 and valved line 56, valved line 55' being closed.

Referring now to Figure 2 there is shown apparatus whereby a slurry of benzene crystals suspended in mother liquor is formed by the evaporation of a portion of the diluent from the admixture. In the operation of the apparatus by this method some low boiling diluent such as propane is highly effective. Proportioning pump 3 draws the benzene-containing mixture and the liquefied propane from their respective storage tanks and sends them in parallel lines to chiller 6, as shown by the arrows, excepting that the to-be-treated benzene in this modification receives a preliminary chilling, insufficient for crystallization, however, in heat exchanger 4, the liquefied propane flowing directly to chiller 5, wherein a portion of the propane is evaporated through valved line 86 thereby chilling the remaining liquefied propane flowing through said chiller. For improved operation, because of pressure conditions in chiller 5, a pump 87 is employed to transfer the chilled propane from chiller 5 to chiller 6 and separator 8.

The benzene-propane admixture flows, as shown by the arrows, through chiller 6, where the evaporation of a further portion of the propane from the admixture through valved line 88' completes the chilling necessary for the formation of a flowable slurry. The so-formed slurry then passes into separator 8, where the mother liquor is withdrawn and the benzene crystals are washed, the latter being discharged into melter 9, where a stream of water in the melter jacket by indirect contact melts the crystals. The now liquid benzene is sent to fractionating column 12 where residual propane is separated from the highly purified benzene, the former leaving column 12 as a vapor through valved line 35 for further purification in column 15. The purified benzene withdrawn from the bottom of column 12 is sent to a benzene storage tank (not shown) after being withdrawn therefrom through cooler 89 by valved line 90.

The propane that is evaporated for chilling purposes is withdrawn from chillers 5 and 6 through valved lines 86 and 88 respectively by compressor 18 and returned after liquefaction in condenser 19 to propane storage tank 1 for further use in the process, said tank 1 also receives the propane separated from the benzene impurities in fractionating column 15 after proceeding according to the method described for Figure 1. The necessary reflux for fractionating columns 12 and 15 is supplied by proportioning pump 3 through valved lines 91 and 92 respectively. The benzene impurities, which may contain some benzene, are withdrawn from column 15 through cooler 93 by valved line 94 and may be sent to a motor fuel storage tank (not shown) in those instances where relatively pure benzene is being processed.

If a sufficient amount of propane is employed to chill the benzene-propane mixture to a temperature of minus 15 degrees to minus 30 degrees Fahrenheit, then from 70 to 80 percent of the purified benzene may be removed from the bottom of the fractionating still 12. The remaining 30 to 20 percent of the benzene will be a benzene residue which could be utilized in motor fuel. This impure benzene may be removed with the mother liquor from the bottom of fractionating still 15 through a valved line 95.

In case it is desired to remove from 50 to 60 percent of the benzene as purified benzene by crystallization, then the amount of propane which is to be used (about 0.6 lb. of propane per lb. of benzene) will be sufficient to provide a slurry for flowing the crystals in the mother liquor and the temperature of chilling will be in the neighborhood of zero degrees Fahrenheit. The purified benzene in such cases will be removed from the bottom of the fractionating still 12 and the mother liquor containing from 40 to 50 percent benzene will be removed from the base of the still 15 through a line 96 by which the impure benzene is introduced into the mid-portion of a fractionating still 97. As the impure benzene flows through the line 96 isopropyl alcohol is introduced into the line through a valved line 98. The alcohol forms an azeotropic mixture with the benzene in the mother liquor and this benzene-alcohol azeotrope is distilled overhead and passes through a line 99 into a condenser 100 and then flows into a receiver 102. Impurities of the benzene or the mother liquor which contains from 10 to 15 percent of benzene is removed from the base of the still 97 through a valved line 103 and may be used as a motor fuel product. The benzene-isopropyl alcohol azeotrope flows from the bottom of the receiver 102 through a line 104 to a separator 105. As the azeotropic mixture flows through the line water is added through a valved line 106 in sufficient quantity to dilute the alcohol to such a degree as to separate the alcohol from the benzene. The dilute alcohol will be withdrawn from the separator through a valved line 107 and the purified benzene is withdrawn from the separator through the valved line 108.

The following examples are illustrative of the results obtainable by operation of the above-described methods:

Example 1

A benzene product distilling, in standard Barrett apparatus, between the temperatures 79.8° C. and 84.4° C. and having a solidification point of substantially 4.6° C. was mixed with commercial-grade liquid butane in the proportions respectively of about 3 to 1. The admixture was thereafter passed to a chilling apparatus where it was cooled to about minus 12 degrees C. to form a slurry, said slurry being passed to a centrifuge wherein the benzene crystals were separated from mother liquor. The so-separated crystalline product was washed with a small amount of chilled liquid in the centrifuge, and subsequently melted and a 60 percent yield of a benzene product having a solidification point of 5.46° C. was obtained.

Example 2

A benzene product distilling, in standard Barrett apparatus, between the temperatures 79.8° C. and 84.4° C. and having a solidification point of substantially 4.6° C. was mixed with Stoddard solvent (Commercial Standard CS3-40, Bureau of Standards, U. S. Department of Commerce) in the proportions respectively of about 4 to 1. The admixture was thereafter passed to a chilling apparatus where it was cooled to about minus 6 degrees C. to form a slurry, said slurry being passed to a centrifuge wherein the benzene crystals were separated from mother liquor. The so-separated crystalline product was washed with a small amount of chilled Stoddard solvent in the centrifuge, and subsequently melted and distilled to remove residual Stoddard solvent therein and a 43 percent yield of a benzene product having a solidification point of 5.55° C. was obtained.

Example 3

A benzene product distilling, in standard Barrett apparatus, between the temperatures of 79.8° C. and 84.4° C. and having a solidification point of substantially 4.6° C. was mixed with commercial-grade liquid propane in the proportions respectively of about 4 to 6. The admixture was thereafter passed to a chilling apparatus wherein was maintained a pressure of about 2.7 lbs. per square inch gauge, thus allowing about 83 percent of the liquid propane present in the admixture to vaporize and thereby cooling the admixture to about minus 4° C. to form a slurry, said slurry being passed to a centrifuge wherein the benzene crystals were separated from mother liquor. The so-separated crystalline product was washed with a small amount of chilled liquid propane in the centrifuge, and subsequently melted and a 65 percent yield of a benzene product having a solidification point of 5.50° C. was obtained.

Example 4

A benzene product containing about 95 percent benzene and about 2.5 percent each by volume of cyclohexane and 2,2,3-trimethylbutane and having a solidification point of substantially 3.3° C. was mixed with isopropyl alcohol in the proportions respectively of about 4 to 1. The admixture was thereafter passed to a chilling apparatus where it was cooled to about minus 5° C. to form a slurry, said slurry being passed to a centrifuge wherein the benzene crystals were separated from mother liquor. The so-separated crystalline product was washed with a small amount of chilled isopropyl alcohol in the centrifuge, and subsequently melted and extracted with water to remove residual isopropyl alcohol therein and a 54 percent yield of a benzene product having a solidification point of 5.57° C. was obtained.

An advantage of the present improved process resides in part in the fact that the miscible liquid added to the impure benzene product at the process-inlet functions as a solvent-diluent and a sort of extraction agent that facilitates flushing the impurities of the benzene from the surfaces of the crystallized product. The miscible agent also acts as a carrier for benzene crystals, resulting in higher recoveries of benzene and a purer product than would be possible with substantially the same degree of crystallization of the benzene itself and furthermore makes it possible to perform the various process steps in a continuous manner.

The present process is suitable for employment in the separation of a wide range of relatively easily crystallizable hydrocarbons and a specific procedure will vary accordingly as the composition of the initial product varies. The yields, as are obvious from the hereinabove stated examples, naturally will also vary with the required degree of purity of the product the procedure is employed to produce. The disposition of the impurities removed from the refined product may be various and is within the skill of the art, being determined largely by the nature of the residual liquor.

This application is a continuation-in-part of my application Serial No. 373,291 filed January 6, 1941, now abandoned for "Method of refining light oil products" which is co-pending herewith.

The invention as hereinabove set forth is embodied in particular form and manner but may be variously embodied within the scope of the claims hereinafter made.

I claim:

1. A method of recovering benzene of a high degree of purity from impure benzene comprising mixing impure benzene with a solvent in which the benzene and the impurities in the benzene are readily dissolved and which does not form an azeotrope with benzene, chilling the mixture to crystallize a major portion of the benzene while thoroughly stirring the mixture to produce fine grained crystals, separating the crystallized benzene from the mother liquor, melting and distilling the benzene to recover a purified benzene, adding a benzene azeotrope solvent to the mother liquor, distilling the mixture to separate a benzene azeotrope from impurities and treating the benzene azeotrope to separate a purified benzene therefrom.

2. The method defined in claim 1 in which a low boiling paraffin hydrocarbon is used as the crystallizing solvent.

3. The method defined in claim 1 in which the azeotrope solvent is an aliphatic alcohol.

4. The method defined in claim 1 in which isopropyl alcohol is used as the azeotrope solvent.

5. The method defined in claim 1 in which from 50 to 60 percent by volume of the benzene is separated by crystallization and from 30 to 40 percent by volume of benzene is separated by azeotropic distillation.

6. The method defined in claim 1 in which the volume of azeotrope solvent added to the mother liquor is about one-third of the volume of benzene in the mother liquor.

7. The method defined in claim 1 in which 15 to 20 percent by volume of propane to the volume of impure benzene is used as the crystallization solvent and about 33⅓ percent by volume of isopropyl alcohol to the volume of benzene in the mother liquor is used for the azeotrope distillation separation.

8. The method defined in claim 1 in which the solvent is separated by distillation from the benzene and mother liquor and returned for re-use in treating more impure benzene.

WILLIAM O. KEELING.

REFERENCES CITED

The following references are of record in the file of this patent:

UNITED STATES PATENTS

| Number | Name | Date |
|---|---|---|
| 1,677,551 | Delas | July 17, 1928 |
| 1,940,065 | Spannagel | Dec. 19, 1933 |
| 1,991,844 | Campbell et al. | Feb. 19, 1935 |
| 2,218,511 | Atwell | Oct. 22, 1943 |
| 2,313,538 | Greenburg | Mar. 9, 1943 |
| 2,356,240 | Hamlin | Aug. 22, 1944 |
| 2,360,655 | Deanesly | Oct. 17, 1944 |
| 2,400,883 | Keeling et al. | May 28, 1946 |
| 2,417,862 | Dale | Mar. 25, 1947 |